INVENTOR.
DONALD C. BOND
BY Edward H Lang
ATTORNEY

INVENTOR.
DONALD C. BOND
BY
Edward H. Sany
ATTORNEY

United States Patent Office 3,306,320
Patented Feb. 28, 1967

3,306,320
APPARATUS FOR DETECTING CHANGE IN LIQUID COMPOSITION FLOWING IN PIPELINE
Donald C. Bond, Crystal Lake, Ill., assignor, by mesne assignments, to Union Oil Company of California, Los Angeles, Calif., a corporation of California
Continuation of application Ser. No. 144,659, Oct. 12, 1961. This application Oct. 4, 1965, Ser. No. 495,765
1 Claim. (Cl. 137—624.13)

This application is a continuation of application Serial No. 144,659, filed October 12, 1961, and now abandoned.

This invention relates to monitoring liquids and, more particularly, to apparatus for detecting a change in composition in a liquid flowing through a pipeline. The method and apparatus of this invention is especially useful in detecting the interface between liquids having closely similar properties.

In some industries, such as the petroleum and chemical industries, it is essential to monitor a liquid flowing through a pipeline to detect a change in composition in the liquid. For example, in transporting crude oils and various refined petroleum products through pipelines, it is customary to send successive batches of different crude oils or of different petroleum products through the pipelines since very little mixing occurs at the interface between the liquids. The various fluids are segregated at a refinery pumping station, terminal, etc., by the manipulation of valves at the delivery point, or any intermediate point. The position of an interface between two products in a pipeline can be estimated with limited accuracy by knowledge of the flow rate in the line, but it is highly desirable to know the position of the interface with considerably more accuracy, and thus permit segregation of the liquids with a minimum amount of intermixing.

Various methods have been proposed for indicating the position of an interface so that valves can be operated at the proper time to avoid inadvertently mixing the several batches. In some of the methods which have been heretofore proposed, the detection of the fluid interface is accomplished by measurement of a distinctive physical property, such as vapor pressure, viscosity, gravity, dielectric constant, etc., with changes in the measured property being indicative of the passage of an interface. However, while methods based on a difference in physical properties can be used to detect the interface between dissimilar liquids, such as fuel oil and gasoline, they are inadequate for detecting the interface between batches of liquids having similar properties, such as different types of gasoline. Various laboratory apparatus, such as the colorimeter and instruments for measuring refractive index, have been used on an experimental scale, but have not proved suitable for field installation. Capacitance analyzers have also been proposed for detecting a batch interface in pipelines. A capacitance analyzer, however, is subject to the disadvantages that significant changes in dielectric constant occur within a single batch of fluid to makes the detection of a liquid interface more difficult, entirely different products could give identical dielectric indications, and dissolved water and free water also impose a possible error with this type of instrument. Some methods have been based on the addition of a tracer material, such as a radioactive tracer, to at least one of each pair of adjacent products to impart an unnatural property to the products so it can be detected. The addition of these contaminating tracers to the product is undesirable and may be hazardous and costly.

Similarly, in plants such as petroleum refineries and chemical plants, it is often essential to monitor fluids flowing through pipes for changes in composition. For example, it may be desirable to maintain a constant check on liquids for the purpose of controlling the processing in the event that the composition changes to an undesirable extent. This invention relates to a method and apparatus for overcoming these and related deficiencies of the prior art.

It is, therefore, an object of this invention to provide apparatus for monitoring liquids flowing through pipes.

Another object of this invention is to provide apparatus utilizing static electricity for detecting a change in composition in a liquid flowing through a pipeline.

A further object of this invention is to provide apparatus utilizing static electricity for detecting a liquid interface in a pipeline.

A still further object of this invention is to provide apparatus utilizing static electricity for detecting the interface between two liquids having very similar compositions.

These and further objects of this invention will become apparent as the description proceeds and reference is made to the accompanying drawings, in which.

Figure 1:
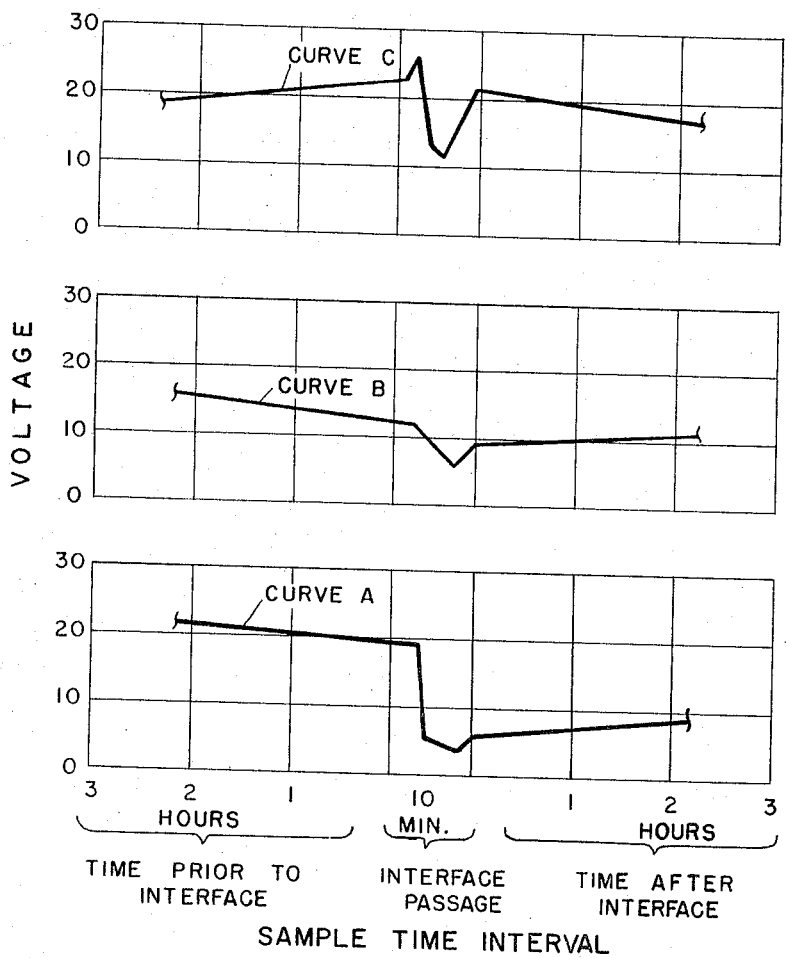
FIGURE 1 is a graph showing the change in electrostatic voltage generated at the liquid interface of different liquids flowing in a pipeline.

In accordance with this invention, I have discovered apparatus for detecting changes in composition in a fluid flowing through a pipeline. This invention is based on the difference between the static-electricity-generating propensity and dissipating ability of liquids having different compositions. In this invention, a portion of a liquid flowing through a pipe is passed through an apparatus capable of generating electrostatic charges in the flowing fluid, and successively determining the amount of static electricity so generated. When the fluid passing the monitor point changes in composition, the rate of static-electricity generation changes, indicating a change in the liquid composition.

In general, the generation of static electricity in flowing liquids is a very complicated phenomenon; it is not possible to predict just how much static charge will be generated in a given situation. However, if the physical environment, i.e., piping arrangement, static-generating means, etc., is constant, the amount of charge generated is dependent upon the nature of the liquid. The rate of static-electricity generation can vary over wide limits, even in different batches of the same product, depending on the amount and nature of impurities in each batch. But in any particular batch of constant composition, the static-electricity-generating properties will be constant, thereby providing an exceedingly sensitive criterion for indicating a change in composition in liquids flowing in a pipe.

In a typical pipeline operation, a first commodity is pumped through the pipeline and immediately followed by a second commodity of different composition without separation of the commodities by mechanical means. A volume of fluid exists at the interface between the two commodities which is of mixed composition varying from the composition of the first fluid to that of the second fluid. Thus, in an ideal case, if the composition of the interface is plotted as a function of the length of the interface, a smooth S-shaped curve is obtained. In a flowing system, a plot of composition at any point on the pipeline as a function of time yields a similar S-shaped curve. Since many physical properties vary in proportion to composition, these physical properties would also uniformly vary over the length of the interface. As previously mentioned, certain of these properties are sometimes useful in interface detection. However, where the preceding and following commodities have a substantially similar physical property, this property is not a suitable interface indicator.

This invention is especially useful in detecting the passage of a pipeline interface. By this invention, the interface between two liquids having very similar properties can be detected without the utilization of contaminating tracer materials. The passage of an interface can be detected by measurement of the static-generating properties of a portion of the product flowing through the pipeline. The commodity of mixed composition at the interface exhibits a reduced static generating property so that a plot of static voltage versus time yields a minimum value less than that exhibited by either of the unmixed commodities useful as an interface indicator. Contrary to what might be expected, in cases where the two products have about the same static-generating properties, the voltage-versus-time curve still shows a minimum value at the point of interface. Where the electrostatic generating property of the product is successively determined at short time intervals according to the method of this invention, the measured voltage values decrease in value from that exhibited by the preceding commodity to a minimum value at the interface, and then increase in value to that of the second product, no matter whether the preceding or following commodity exhibits the higher electrostatic generating property. The rate of static electricity generated can be fed into a suitable circuit and passed to an indicator, recorder, or automatic-control equipment for indicating, measuring, or automatically operating valves, starting pumps, etc.

In order to demonstrate that the passage of an interface can be detected by measurement of the static-generating properties of the flowing liquid, a series of experiments were conducted, the results of which are graphically shown in FIGURE 1. In these tests, apparatus similar to that shown by Klinkenberg and Van der Minne, "Electrostatics in the Petroleum Industry," Elsevier Press, 1958, p. 167 was used. The apparatus used consisted of a 125 cc. separatory flask with a valve. The separatory flask was connected to a 24-inch length of an electrically grounded stainless steel tubing with a 2-mm. inside diameter. The lower end of the stainles steel tubing was located 50 millimeters above a brass beaker which was based on a Lucite table. The electrostatic charge developed in the product was detected by a high-impedance voltmeter (Keithley model 610 Electrometer) connected between the brass beaker and a second electrical ground. The second electrical ground consisted of a common connection from the tubing and the negative voltmeter lead to water pipes, and also to the conduit of the 115-volt alternating-current supply for the "Electrometer." Samples were taken from a pipeline in one-half gallon quantities starting at least about one hour prior to the interface, continuing with five one-half gallon samples during the interface, and ending with a one-half gallon sample at least about one hour after the interface. In conducting the experiments, the electrostatic-generating characteristics of each one-half gallon sample was tested by closing the separator valve, adding 100 cc. of the sample to the flask, opening the valve, and noting the electrostatic charge detected by the "Electrometer." The "Electrometer" was zeroed at the start of each complete interface run, a run consisting of a complete group of about seven 100 cc. interface samples. The brass beaker was grounded after each 100 cc. sample was run. The results of these tests are shown in FIGURE 1 by plotting the electrostatic charge generated in a complete group of interface samples against time. Curve "A" represents the results obtained when the interface was between two liquids having different static-generating properties, "Gulf No Nox" gasoline to "Gulf" No. 1 Fuel Oil. Curves "B" and "C" are representative of the results obtained when the interface was between two liquids having similar properties, "Gulf" Regular gasoline to "Gulf No Nox" gasoline, and "Gulf" No. 1 Fuel Oil to "Gulf" No. 2 Fuel Oil, respectively. The results as depicted in the graph clearly show that not only does this invention provide a method of determining the interface between the similar products, but, it provides a method of interface detection between liquids having very similar properties, i.e., different types of gasolines or different types of fuel oils.

When this invention is used to detect the interface between liquids being transported through a pipeline to a remote point, it is advantageous to position the monitoring device upstream from a station where a cut is to be made to separate one liquid from the other. Since the rate at which the interface is moving through the pipeline is known with sufficient accuracy to permit prediction of its arrival a short distance downstream in the pipeline, it is possible to set a time delay into the control apparatus so as to automatically make the cut when the interface reaches the valves. When the cut is to be made manually, the operator can do so at the proper time after the interface has passed the monitor.

Another method is to have two monitoring devices, one upstream in the pipeline and the other at the pumping station, terminal, etc. The upstream monitor indicates the change in rate of electrostatic generation and this enables the operator to easily note when the interface passes the station. When the same change in rate of electrostatic generation occurs at the station, it is observed by the operator who can then turn the appropriate valves at the proper time.

Figure 2:
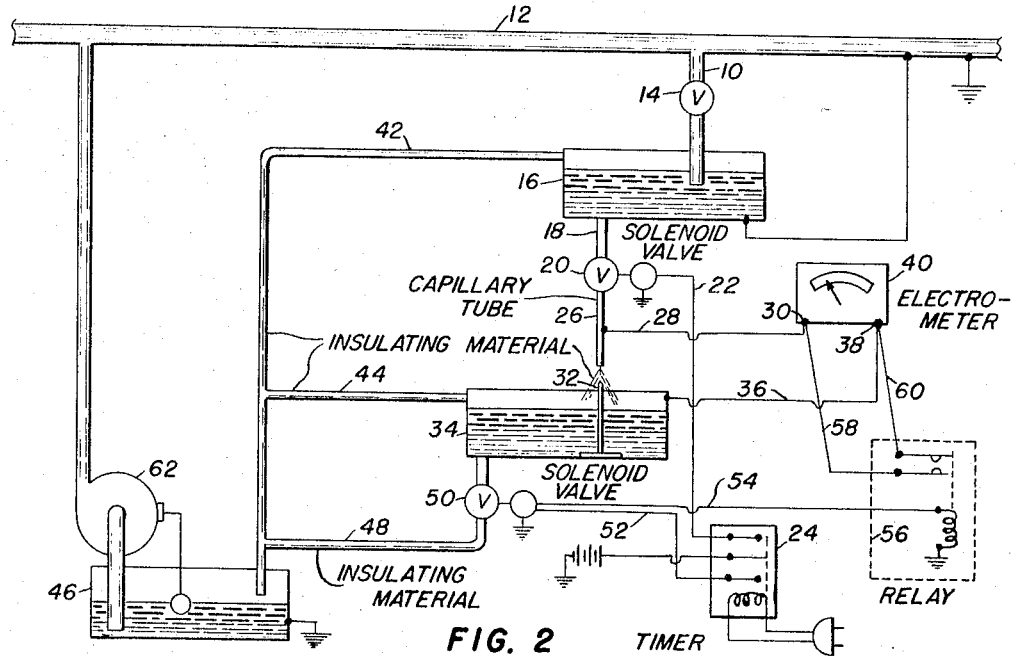
FIGURE 2 is a schematic diagram of a fluid monitoring apparatus together with a circuit for indicating the rate of electrostatic generation.

A preferred embodiment of this invention is shown in FIGURE 2 wherein branch line 10 is cut into pipe 12 at or near the point at which the fluid is to be monitored for change in composition. Branch line 10 is provided with throttling valve 14 to control the liquid flow-rate therein. Branch line 10 leads to liquid reservoir 16 of electrically conductive material such as brass, which serves to retain the side-stream sample while flow through the static generator is interrupted, as will be subsequently described. Flow from reservoir 16 through liquid conduit 18 of electrically conductive material, such as brass, is controlled by solenoid-operated valve 20. Solenoid-operated valve 20 is electrically connected by lead 22 to a timer 24, such as an Eagle Signal Company's Flexopulse. From conduit 18 the side-stream sample flows through a device for generating static electricity therein. Although the illustrated device for generating electrostatic charges is electrically conductive capillary tube 26, it can be any device known in the art, such as a metallic filter, for generating electrostatic charges in liquids. Capillary tube 26 is connected by lead 28 to terminal 30. From capillary tube 26, the side-stream having an electrostatic charge drops on to vertical glass rod 32 in receptacle 34. Receptacle 34 is of an electrically conductive material, such as brass, and is connected by lead 36 to terminal 38. Electrometer 40, such as Keithley model 610 Electrometer, is connected between terminals 30 and 38. Reservoir 16 and receptacle 34 are provided with electrically non-conductive overflow lines 42 and 44, respectively, which are connected to overflow tank 46. Receptacle 34 is also provided with drain line 48 connected to overflow tank 46. Suitable materials for lines 42, 44 and 48 are ceramic, glass, plastic such as polyethylene, fluorinated ethylene polymers, etc. Liquid flow through drain line 48 is controlled by solenoid-operated valve 50 which, in turn, is connected by lead 52 to timer 24. Solenoid-operated valve 50 is connected by lead 54 to relay 56, to which electrometer 40 is also connected by leads 58 and 60. Relay 56 serves to short electrometer 40 and electrically ground capillary tube 26 and receptacle 34 when solenoid-operated valve 50 opens drain line 48. If desired, a overflow tank 46 can be provided with float-actuated pump 62 to introduce the side-stream back into pipe 12.

In operation of the apparatus, a side-stream sample flows from pipe 12 through branch line 10 to reservoir 16, and thence through capillary tube 26 where an electrostatic charge is generated in the liquid. The charged liquid then drops on to rod 32 and accumulates in receptacle 34. The charge on receptacle 34 is noted on electrometer 40 immediately prior to the actuation of timer 24. Periodically, about once a minute for example, timer 24 actuates solenoid-operated valve 20 to terminate flow through capillary tube 26. Simultaneously, timer 24 actuates relay 56 to electrically ground capillary tube 26 and receptacle 34, as well as to short out electrometer 40, and actuates solenoid-operated valve 50 to empty receptacle 34 through drain line 48. After the liquid in receptacle 34 has been drained therefrom, timer 24 automatically closes solenoid-operated valve 50, opens solenoid-operated valve 20, and disconnects the short circuit to electrometer 40. The sequence of operation is then repeated to test another side-stream sample. It will be apparent that if the readings on electrometer 40 immediately prior to the operation of timer 24 to short out electrometer 40 are plotted versus time, a saw-tooth-type curve is obtained. A change in composition of the liquid being monitored is indicated by an abrupt change in the static-electric-generating properties of the liquid, which, in turn, is indicated by a deflection in the curve as hereinbefore described.

Figure 3:
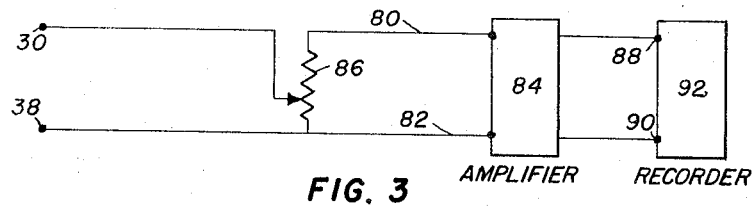
FIGURE 3 shows a schematic wiring diagram of another circuit which may be utilized with the apparatus shown in FIGURE 2.

Referring to FIGURE 3, there is shown a circuit that can be used in lieu of electrometer 40, as described in reference to FIGURE 2. Terminals 30 and 38 are connected by leads 80 and 82, respectively, to amplifier 84, which includes a suitable power supply, through potentiometer 86 of suitable magnitude. Such a circuit having components of proper design may be readily provided by one skilled in the art. The output from amplifier 84 is connected to terminals 88 and 90 which, in turn, are connected to recorder 92. An example of a suitable recorder is a "Minneapolis-Honeywell Electronik." If desired, recorder 92 may be replaced or supplemented by a meter for indicating d'Arsonval movement, or by a suitable controller which is actuated by the signal from amplifier 84 and automatically operates valves. A schematic diagram of such a control circuit is illustrated in FIGURE 4.

Figure 4:
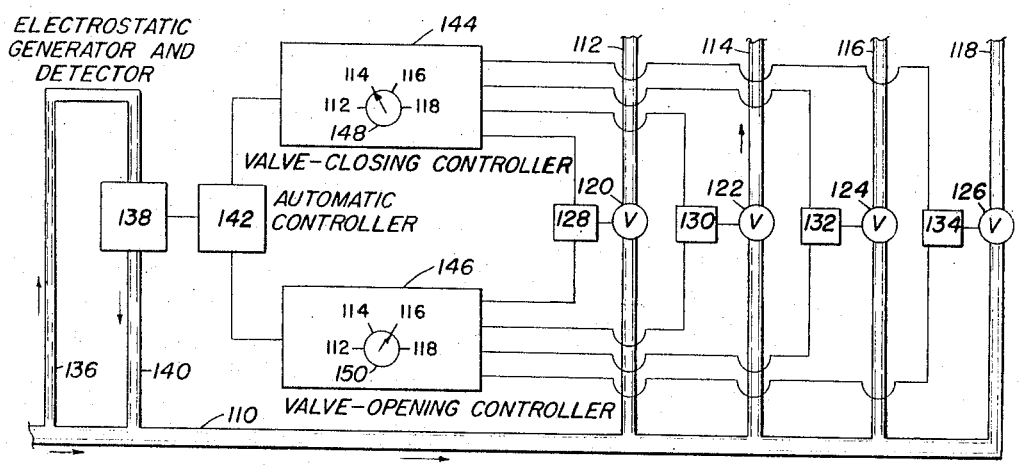
FIGURE 4 is a schematic diagram of a circuit for automatically operating valves.

FIGURE 4 schematically illustrates a control system that can be used with this invention for automatically operating valves in a pipeline when a different product arrives at a manifold system. Pipeline 110 is provided with branch lines 112, 114, 116 and 118, in which are located flow-control valves 120, 122, 124 and 126, respectively, each branch-line connected to a different storage tank. Flow-control valves 120, 122, 124 and 126 are equipped with power-driven actuating mechanisms 128, 130, 132 and 134, respectively. In accordance with this invention, a side-stream is withdrawn from pipeline 110 through branch-line 136 which is located upstream from the manifold system. From branch-line 136, the side-stream flows through electrostatic-generating-and-detecting system 138 and back through line 140 into pipeline 110. Electrostatic-generating-and-detecting system 138 can be the same as that described in reference to FIGURE 2, except that a portion of the circuit shown in FIGURE 3, from terminals 30 and 38 to terminals 88 and 90, is connected to terminals 30 and 38 in lieu of electrometer 40. The output from electrostatic-generating-and-detecting system 138 is fed to automatic controller 142. Automatic controller 142 contains an adjustable time-delay circuit which can be set so that operation of the actuating mechanisms for the branch-line valves does not occur until the interface passes from the monitoring point to the appropriate branch-line. The output signal from automatic controller 142 is fed to valve-closing controller 144 and valve-opening controller 146, each of these controllers being connected to actuating mechanisms 128, 130, 132 and 134.

Controllers 144 and 146 are provided with selector switches 148 and 150, respectively, to permit selection by the operator of appropriate branch-lines for the products being received. Automatic controller 142 and actuating mechanisms 128, 130, 132, and 134 may, for example, be modifications of the static-electricity-detection-and-control systems disclosed in U.S. Patents 2,909,190 and 3,013,578.

As an example of the operation of the automatic control system, the product being transported through pipeline 110 flows through branch-line 114, valve 112 being in the open position, while valves 120, 124 and 126 are closed. Since it is desired to route the next product received through branch-line 116, the station operator turns switch 150 to operate valve-actuating mechanism 132, and turns switch 148 to operate valve-actuating mechanism 130. When the interface passes through electrostatic-generating-and-detecting system 138, automatic controller 142 senses an abrupt change in the rate of electrostatic generation and sends a signal to valve-closing controller 144 and valve-opening controller 146. Controllers 144 and 146 then actuate the appropriate valve-actuating mechanisms and close valve 122 and open valve 124, respectively. After this has occurred, the station operator then turns switch 148 to close valve 124, and turns switch 150 to control the valve in the branch-line through which the next product is to be routed. Alternatively, controllers 144 and 146 may be such that one pulse opens the selected valve while the next pulse closes the valve. Under the circumstances, only one of the controllers is active at any given time, and the operator merely sets the selector switch on the inactive controller so it will be activated by arrival of the next interface, with the next product being diverted into the proper branch-line.

In still another embodiment of the automatic control system, it is made more automatic by providing controllers 144 and 146 with sequence-setting mechanisms. In this embodiment, useful in instances where the order in which the products are to arrive at the monitoring station is known, controllers 144 and 146 are set to operate the appropriate valve-actuating mechanisms to route the products through the correct branch-lines as they arrive. For example, the product being transported through pipeline 110 is being routed through branch-line 114 and the subsequent four products are to be routed through branch-lines 112, 116, 114 and 118 as they arrive. Controller 144 is then set to operate valve-actuating mechanism 130 upon the next pulse from automatic controller 142, and then mechanisms 128, 132 and 130 at subsequent pulses. Controller 146 is set to operate valve-actuating mechanisms in the sequence of 128, 132, 130, and 134 upon pulses from automatic controller 142 as it detects interfaces.

Figure 5:
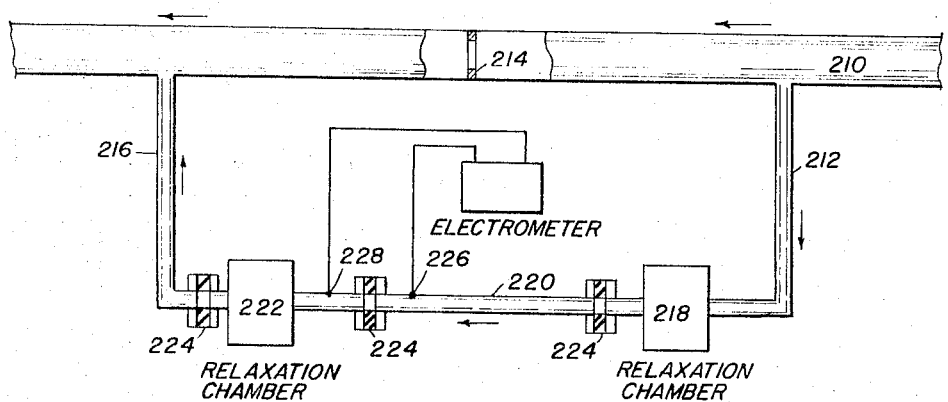
FIGURE 5 is a schematic diagram of an alternative embodiment of this invention.

An alternative embodiment of this invention is shown in FIGURE 5. In this embodiment, a portion of the fluid flowing through line 210 is diverted through branch line 212. The proper pressure difference to insure flow of a side-stream through branch line 212 may be obtained by placing constriction 214 in pipe 210 ahead of return line 216. From branch-line 212, the liquid sample flows through electrically conductive relaxation chamber 218 to retard the flow thereof, through electrically conductive capillary tube 220, into electrically conductive relaxation chamber 222, and thence back into line 210 through return-like 216. Electrically non-conductive flanges or couplings 224 are provided between capillary tube 220 and chambers 218 and 222, as well as between chamber 222 and return-line 216. Suitable electrically non-conductive materials are plastics such as polyethylene, fluorinated ethylene polymers, and the like. Terminals 226 and 228 are on capillary tube 220 and chamber 222, respectively. Terminals 226 and 228 are connected to a suitable indicator, recorder, or automatic controller, such as described in reference to FIGURES 2, 3 and 4 (shown in dotted lines).

Various modifications of the electrostatic-generating-and-detecting system which may be employed will be obvious to those skilled in the art. For example, electrostatic-generating devices other than an electrically conductive capillary tube may be utilized.

The method of this invention may also be used for monitoring gas streams for changes in composition. Since dry, clean gas will not generate static, it would be necessary to condense the diverted sample into a liquid to be monitored. For example, in FIGURE 4, electrostatic-generating-and-detecting system 138 would include means for condensing the gas sample before monitoring it. A gas containing liquid droplets, dust, dirt or scale will cause static to be generated and can be monitored without being condensed.

The embodiments of the invention in which an exclusive property or privilege is claimed are defined as follows:

An apparatus for detecting the interface between different hydrocarbon liquids flowing through a conduit, which comprises:
 a liquid-containing reservoir having an electrically conductive interior surface adapted to contact the contained liquid, said electrically conductive surface being connected to ground;
 means for withdrawing a portion of said liquid from said conduit and conducting said withdrawn liquid to said reservoir;
 an elongated tubular member of capillary dimension substantially vertically disposed beneath said reservoir said tubular member communicating with said reservoir at its inlet end and having an open discharge end;
 flow control means for periodically interrupting the flow of liquid from said reservoir through said tubular member;
 a receptacle having an electrically conductive interior surface positioned beneath the open discharge end of said tubular member, said surface being electrically insulated from said tubular member and from ground;
 means for periodically withdrawing liquid from said receptacle;
 means for measuring the electrostatic charge developed by said liquid flowing through said tubular member and accumulated on the electrically conductive surface of said receptacle; and
 timing means operatively connected to said flow control means, to said means for periodically withdrawing liquid from said receptacle, and to said receptacle for periodically stopping flow through said tubular member, emptying said receptacle, and grounding the electrically conductive surface of said receptacle preparatory to commencing a subsequent determination.

References Cited by the Examiner

UNITED STATES PATENTS

| | | | |
|---|---|---|---|
| 2,492,493 | 12/1949 | Misson | 324—71 |
| 2,654,067 | 9/1953 | Bruce | 324—61 |
| 2,859,757 | 11/1958 | Parsons | 137—2 |

OTHER REFERENCES

Klinkenberg et al.: "Electrostatics in the Petroleum Industry," Elsevier Pub. Co., N.Y., 1958, pages 49–55 and 166–168 relied on.

WALTER L. CARLSON, *Primary Examiner.*

C. F. ROBERTS, *Assistant Examiner.*